US007069159B2

(12) United States Patent
Zima et al.

(10) Patent No.: US 7,069,159 B2
(45) Date of Patent: Jun. 27, 2006

(54) ELECTRIC POWER TRANSMISSION NETWORK STATE ESTIMATION

(75) Inventors: Marek Zima, Baden (CH); Christian Rehtanz, Baden-Dättwil (CH)

(73) Assignee: ABB Research Ltd, Zurich (CH)

( * ) Notice: Subject to any disclaimer, the term of this patent is extended or adjusted under 35 U.S.C. 154(b) by 155 days.

(21) Appl. No.: 10/314,222

(22) Filed: Dec. 9, 2002

(65) Prior Publication Data

US 2003/0120440 A1 Jun. 26, 2003

(30) Foreign Application Priority Data

Dec. 21, 2001 (EP) .................................. 01811253

(51) Int. Cl.
*G01R 15/00* (2006.01)
*G06F 19/00* (2006.01)

(52) U.S. Cl. ........................................................ 702/57

(58) Field of Classification Search ................. 702/57, 702/59, 62, 64; 700/6, 292; 324/521; 340/310.01
See application file for complete search history.

(56) References Cited

U.S. PATENT DOCUMENTS

| | | | | | |
|---|---|---|---|---|---|
| 3,903,402 | A | * | 9/1975 | Petit et al. ....................... | 700/6 |
| 5,272,462 | A | * | 12/1993 | Teyssandier et al. .... | 340/310.01 |
| 5,428,549 | A | * | 6/1995 | Chen .............................. | 702/59 |
| 6,236,949 | B1 | * | 5/2001 | Hart .............................. | 702/64 |
| 2001/0021896 | A1 | * | 9/2001 | Bertsch et al. ................ | 702/62 |
| 2003/0101008 | A1 | * | 5/2003 | Hart .............................. | 702/57 |
| 2004/0073387 | A1 | * | 4/2004 | Larsson et al. ................ | 702/57 |

FOREIGN PATENT DOCUMENTS

| | | |
|---|---|---|
| EP | 0795944 A2 | 9/1997 |
| EP | 1134867 A1 | 9/2001 |

OTHER PUBLICATIONS

Roget's New Millennium™ Thesaurus, First Edition (v 1.1.1)Copyright© 2005 by Lexico Publishing Group, LLC.*
A.G. Phadke, et. al., "State Estimation with Phasor Measurements", IEEE Transactions on Power Systems, vol. PWRS-1, No. 1, Feb. 1986, pp. 233-238.
Khoi Vu et al, "Voltage Istability Predictor (VIP) and Its Applications," Power Systems Computation Conference (PSSC) Jun. 1999, 7 pages.

(Continued)

*Primary Examiner*—Michael Nghiem
*Assistant Examiner*—Aditya Bhat
(74) *Attorney, Agent, or Firm*—Buchanan Ingersoll PC

(57) ABSTRACT

In a method, computer program and system for estimating a state of an electric power transmission network, time-stamped phasor measurements are made by phasor measurement units (1) located at a first set of locations (11,12) throughout the network, and a plurality of voltage and/or current phasors at a second set of locations is estimated, where the locations of the first (11,12) and second sets of locations are distant from one another, and a status of network elements (L4,L5,13) that are remotely located from the phasor measurement units is inferred from the phasor measurements and the estimated phasors. In a preferred variant of the invention, the network elements are transmission lines (L1 . . . L8), switchgear, under load tap changing transformers, compensation devices (13) or FACTS devices, and the status information describes whether a network element (L4,L5,13) is electrically connected to or disconnected from the network.

10 Claims, 2 Drawing Sheets

OTHER PUBLICATIONS

Khoi Vu et al., "Use of Local Measurements to Estimate Voltage-Stability Margin," IEEE Transactions on Power Systems, vol. 14, No. 3, Aug. 1999, pp. 1029-1035.

Khoi Vu et al., "Grids Get Smart Protection and Control," IEEE Computer Applications in Power, Oct. 1997, pp. 40-44.

D.E. Julian et al., "Quantifying Proximity to Voltage Collapse Using the Voltage Instability Predictor (VIP)," IEEE Power Engineering Society Summer Meeting, 2000, 931-936.

* cited by examiner

ELECTRIC POWER TRANSMISSION NETWORK STATE ESTIMATION

FIELD OF THE INVENTION

The invention relates to large-scale electric power transmission networks, and, more particularly, to a method, a computer program and a system for estimating a state of an electric power transmission network.

BACKGROUND OF THE INVENTION

Electric power transmission and distribution systems or networks comprise high-voltage tie lines for connecting geographically separated regions, and substations for transforming voltages and for switching connections between lines. Power generation and load flow in a network with several substations is controlled by an energy management system. For managing the network, it is desirable to determine a state of the network, in particular load flows and stability margins. Measurements of average RMS (root mean square) values of voltages, currents, active power and reactive power flowing in the network and/or measurements of voltage and current phasors are made at various places in the network and collected by substation automation (SA) systems and by a system control and data acquisition (SCADA) system. The SA and SCADA systems further provide information about a status of network elements such as switchgear, compensation devices and variable transformers. The status of switchgear (i.e. circuit breakers, disconnectors, etc.) allows to infer the topology of the network, i.e. how the lines and devices are connected, and which lines, power generators and consumers are disconnected. Additionally, measurements of voltage and current phasors are made and collected. All the abovementioned measurements from throughout the network are collected at the energy management system, providing a snapshot of the state of the network. The snapshot allows to compute the state of the network, as described e.g. in "State estimation with phasor measurements", Phadke et. al., IEEE Transactions on power systems, Vol. PWRS-1, No. 1, February 1996. There, all positive sequence bus voltages and some positive sequence currents are measured, the network topology is assumed to be known, and unknown voltages, phase angles and power flows are computed.

SUMMARY OF THE INVENTION

It is an object of the invention to create a method, a computer program and a system for estimating a state of an electric power transmission network of the type mentioned initially, which uses less measurements.

These objects are achieved by a method, a computer program and a system for estimating a state of an electric power transmission network according to the claims 1, 8 and 9, respectively.

In the inventive method, computer program and system for estimating a state of an electric power transmission network, time-stamped phasor measurements are made by phasor measurement units located at a first set of locations throughout the network, and a plurality of voltage and/or current phasors at a second set of locations is estimated, wherein the locations of the first and second sets of locations are distant from one another, and a status of network elements that are remotely located from the phasor measurement units is inferred from the phasor measurements and from the estimated phasors.

This allows to estimate a network state without having to collect status information of network elements such as switchgear, compensation and FACTS devices and variable transformers through a SCADA or a Substation Automation system.

An additional advantage is conferred by the fact that phasor measurements incorporate high resolution timing information. It therefore is also possible to obtain a much better temporal resolution for the state estimation, since conventional SCADA systems do not provide time stamped information about e.g. switchgear status. This better temporal resolution allows faster and better quality control of the network.

In a preferred variant of the invention, the network elements are transmission lines, switchgear, under load tap changing transformers, compensation devices or FACTS devices, and the status information describes whether a network element is electrically connected to or disconnected from the network and optionally also describes element specific parameters such as a transformer tapping position or a FACTS impedance value. For switchgear such as breakers or disconnectors, the status information describes whether a switch is open or closed.

In a further preferred variant of the invention, the state that is estimated comprises current and load flows, and optionally indicators characterising network stability. This is possible, since the invention allows to determine, from phasor measurements alone, which network elements are connected, i.e. the network topology. No separate measurements or status information about the network topology are required. Therefore, the invention can work completely independent of and redundant to existing SCADA systems.

The system for estimating a state of an electric power transmission network according to the invention comprises a data processing device configured to compute a plurality of estimated voltage and/or current phasors at a second set of locations, the locations of the first (11,12) and second sets of locations being distant from one another, and to compute, from the phasor measurements and from the estimated phasors, a status of network elements (L4,L5,13) that are remotely located from the phasor measurement units.

The computer program for estimating a state of an electric power transmission network according to the invention is loadable into an internal memory of a digital computer, and comprises computer program code means to make, when said computer program code means is loaded in the computer, the computer execute the method according to the invention. In a preferred embodiment of the invention, a computer program product comprises a computer readable medium, having the computer program code means recorded thereon.

BRIEF DESCRIPTION OF THE DRAWINGS

The subject matter of the invention will be explained in more detail in the following text with reference to preferred exemplary embodiments which are illustrated in the attached drawings, in which.

DETAILED DESCRIPTION OF THE INVENTION

Figure 1:
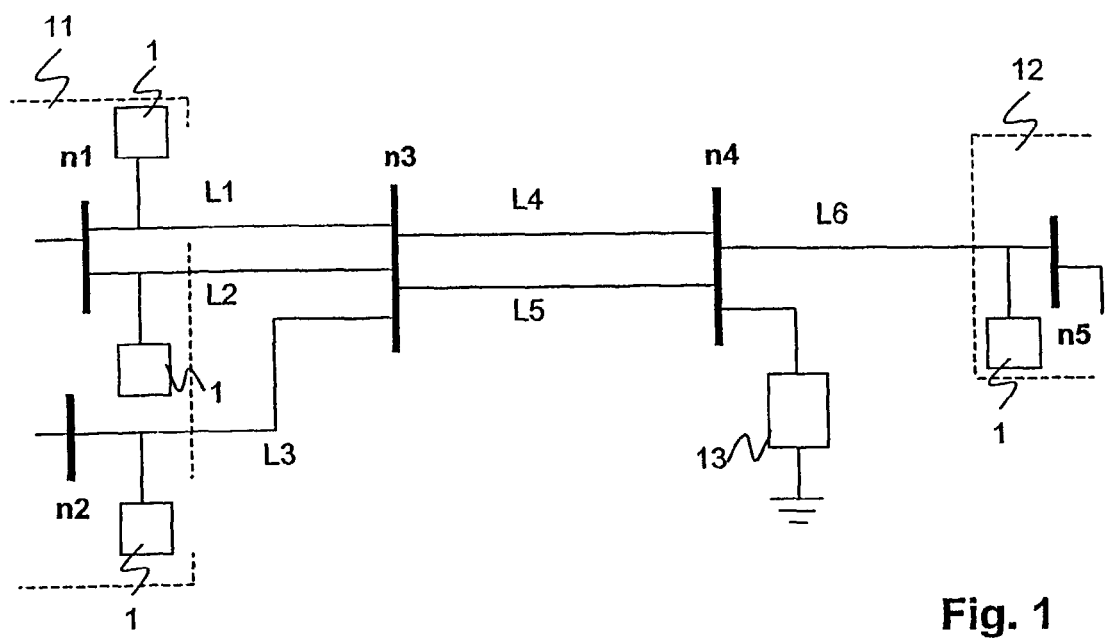
FIG. 1 schematically shows part of an electric power system.

FIG. 1 schematically shows part of an high- or medium voltage electric power system or network comprising nodes n1 . . . n5 such as busbars, and transmission lines L1 . . . L6. A plurality of nodes n1, n2 is located at a first substation 11, another node n5 is located at a second substation 12. A compensation element 13 is connected to a fourth node n4. At the first and second substation 11,12, phasor measurement units (PMU) 1 are configured to measure voltage and/or current phasors at the lines L1,L2,L3,L6 leaving the respective substation 11,12. A third node n3 and the fourth node n4 are not equipped with PMU's. The third node n3 and fourth node n4 are located remote or geographically distant from one another and from the first substation 11 and the second substation 12. They are separated by the lengths of the lines L1 . . . L6 connecting them, typically at distances between one kilometer and several tens or hundreds of kilometers. Where the lines meet the nodes, switchgear devices, not shown in the figures, are configured for electrically disconnecting lines.

Phasor data is determined with a phasor measurement unit residing, for example, at a feeder at the bay level of substations or at branching points along transmission lines. A voltage phasor represents, for example, a voltage of the feeder or line, while a current phasor represents current flowing through the feeder or line.

The phasor data represents a phasor and may be a polar number, the absolute value of which corresponds to either the real magnitude or the RMS value of a quantity, and the phase argument to the phase angle at zero time. Alternatively, the phasor may be a complex number having real and imaginary parts or the phasor may use rectangular or exponential notation. By contrast, conventional sensing devices used in power networks generally measure only scalar, average representations, such as the RMS value of a voltage, current etc.

The phasor data is collected from phasor measurement units that are distributed over a large geographic area, i.e. over tens to hundreds of kilometers. Since the phasor data from these disparate sources are analysed in conjunction, they must refer to a common phase reference. Therefore, the different phasor measurement units must have local clocks that are synchronised to within a given precision. Such a synchronisation of the phasor measurement units is preferably achieved with a known time distribution system, for example the global positioning (GPS) system. In a typical implementation, the phasor data 9 is determined at least every 200 or every 100 or preferably every 40 milliseconds, with a temporal resolution of preferably less than 1 millisecond. In a preferred embodiment of the invention, the temporal resolution is less than 10 microseconds, which corresponds to a phase error of 0.2 degrees. Each measurement is associated with a time stamp derived from the synchronised local clock. The phasor data therefore comprises time stamp data.

According to the invention, it is possible to determine a status of the fourth line L4 and the fifth line L5, i.e. whether said lines are connected or disconnected, without measurements or SCADA data about a status of switchgear at the third node n3 or the fourth node fourth node n4, and even without phasor measurements made at the third or fourth node n3,n4. The term "status" is used to denote properties of network elements such as "connected/disconnected", "open/closed", "tap ratio value" that usually are set by a control device and an actuator associated with a network element, The term "state" comprises both the "status" of network elements as well as e.g. current and power flows throughout the network, and optionally closeness to instability. The state is a result of electrical parameters of the network and of network topology, which is determined by the status of network elements.

Figure 2:
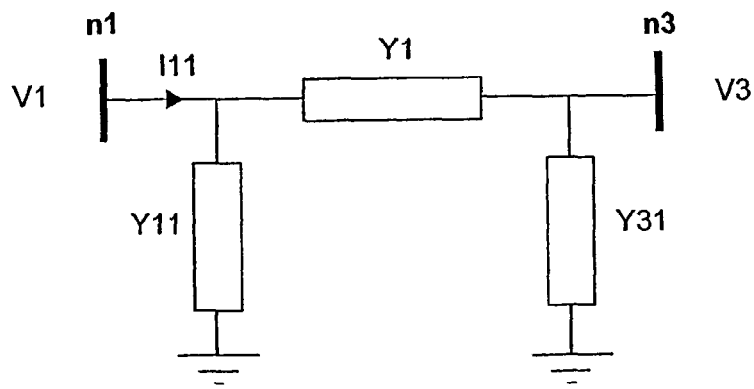
FIG. 2 shows an equivalent circuit for a transmission line

FIG. 2 shows a standard π-equivalent circuit for a transmission line or line segment. V1 is a voltage phasor at the first node n1, I11 is a phasor of a current flowing out of the first node n1 into the first line L1. Both V1 and I11 are measured by a PMU 1 located at the first node n1. The first line L1 is represented by a line admittance Y1 and shunt admittances Y11 and Y31, with Y11=Y31. By convention, for a current, the first index denotes the node from which the current flows, and the second index denotes the line into which it flows. For a shunt admittance, the first index denotes the node at the side of the line where the shunt lies, and the second index denotes the line.

V3 is an unknown voltage phasor at the third node n3. V3 is calculated as $$V3 = \frac{(Y1+Y11)V1 - I11}{Y1}.$$

In a similar fashion, referring to the power system shown in FIG. 1, the voltage V4 at the fourth node n4 is calculated as $$V4 = \frac{(Y6+Y56)V5 - I56}{Y6}$$

from the voltage and current phasors V5,I56 measured at the fifth node n5.

The currents flowing through the first, second and third line L1,L2,L3 into the third node n3 are calculated from V3 and the measurements. For example, $$I31=(Y1+Y31)V3-Y1\,V1$$

The total current from the third node n3 to the fourth node n4 therefore is $$I_{3to4}=-(I31+I32+I33).$$

If this current is zero, then the status of both the fourth and fifth line L4,L5 is "disconnected". If it is nonzero, it is necessary to determine which of said lines L4,L5, if any, is disconnected. Assuming that only the fourth line L4 is connected and that the fifth line L5 is out of service, the current flowing into the fourth line L4 from the third node n3 can be calculated as $$I34=(Y4+Y34)V3-Y4\,V4$$

which ought to be equal to $I_{3to4}$. If it is equal, then the assumption is valid. It is not equal, then the inverse assumption "only the fifth line L5 is connected" is made and checked. If this assumption is invalid as well, then both lines L4,L5 are connected.

In the unlikely case that the admittances of the fourth line L4 and the fifth line L5 are be equal, it is only possible to determine whether none, one or both of these lines L4,L5 is connected. It is not possible to determine which of the two is disconnected. This is, however, not relevant for a load flow calculation that uses this topology information—exactly because the line admittances are equal, regardless of which of the two lines L4,L5 is disconnected.

In order to determine a status of the compensation element 13 that is not observed directly, i.e. it is not equipped with a PMU 1, the procedure for determining voltages and detecting line status as shown above is executed. Then, all currents flowing into the fourth node n4 are computed, depending on the network topology. For example, if both the fourth and fifth line L4,L5 are connected, and from $$I45=(Y5+Y45)V4-Y5\,V5$$

it follows that the sum of currents flowing into the fourth node n4 through lines L4,L5 and L6 is $$I_{4in}=-(I45+I44+I46).$$

If $I_{4in}$ is zero, then the compensation element 13 is disconnected. If $I_{4in}$ is not zero, the compensation element 13 is in use.

For FACTS (flexible AC transmission) devices, with knowledge about the internal workings of the device, status information may be determined from the current and voltage phasors at the device. Regardless of the internal workings, whether a FACTS device is connected or not is inferred in the same way as shown above for the compensation element 13.

Figure 3:
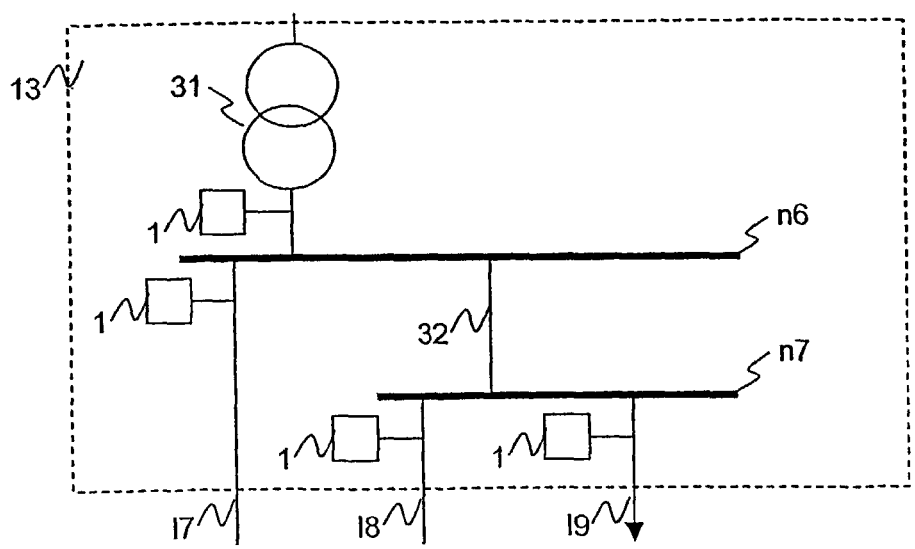
FIG. 3 schematically shows an electrical substation

FIG. 3 schematically shows an third electrical substation 13 with busbars acting as nodes n6,n7, a transformer 31 connected to a sixth node n6, a busbar connector 32 connecting the sixth node n6 to a seventh node n7, and lines L7,L8 and a load 33, each line and load 33 being connected to one of the nodes n6,n7 and having an associated PMU 1. Although the busbar connector 32 is located in the third substation 13, no direct observation with a PMU 1 or current transducer is available. Therefore, the status of the busbar connector 32 is inferred from a currents balance, using phasor measurements at either the sixth node n6 or the seventh node n7. For example, if $$I_{into6}=-(I_{transformer}+I67)$$

is zero, then the busbar connector 32 is open. Otherwise, it is closed.

Transformers without automatic tap changing are modelled like static line elements. i.e. by symmetrical π-equivalent circuits, and have only an on/off status.

Figure 4:
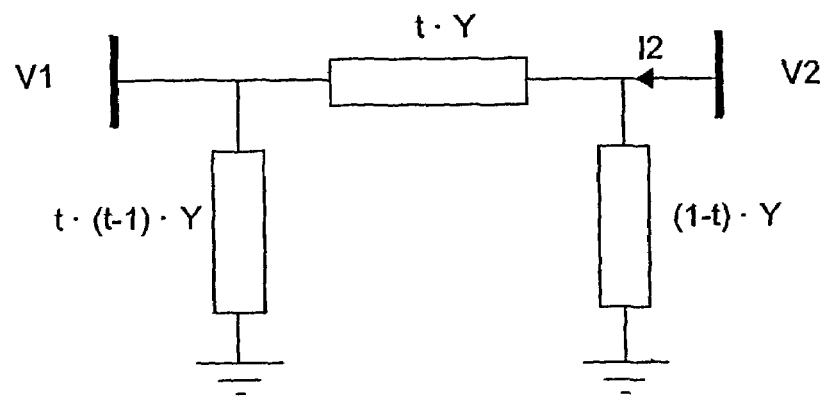
FIG. 4 shows an equivalent circuit for a tap changing transformer

FIG. 4 shows an equivalent circuit for an under load tap changing (ULTC) transformer arranged between nodes with voltage phasors V1 and V2 and a current phasor 12 flowing into the transformer from the node with voltage V2. The admittances of the circuit depend on a tap ratio t. The ULTC transformer is equipped with a control device that adjusts the voltage ratio of the transformer within certain limits around a nominal voltage ratio. The control device tries to drive a regulated voltage, in this case V2, at one side of the transformer to within a deadband around a given nominal value V2nom. This adjustment is represented by the tap ratio t. For t=1, the transformer is set to the nominal voltage ratio. Typically, the tap and voltage ratio can be varied by 5% or 10% around the nominal value. In order to determine the current and load flows of the power network, the tap ratio t must be known. According to the invention, it is not necessary to obtain information from the local ULTC transformer's control device. Instead, the tap ratio t is deduced from phasor information. The phasor information is determined either by one or more PMUs 1 located close to the ULTC transformer, or is inferred from remotely located PMUs 1 as described above. Likewise, it is determined whether the ULTC transformer is connected at all. Parameters of the ULTC transformer that must be known are its nominal admittance Y, incremental tap ratio, minimal and maximal tap ratio t and a deadband area around the nominal regulated value.

Two cases are possible: Either the actual or present value V2nom of the regulated voltage is known, or it is not known.

For the first case, the tap ratio t is determined from the regulated voltage V2 alone. Let $|\quad|$ denote the absolute value of a complex variable. Then, if $|V2|<0.9|V2\mathrm{nom}| \Rightarrow t=0.9$ if $|V2|>1.1|V2\mathrm{nom}| \Rightarrow t=1.1$ $$\text{if } 0.98 < \frac{|V2|}{|V2nom|} < 1.05 \Rightarrow t = 1$$

where 0.98 and PMU 1.05 are bounds of the deadband, and in all other cases, the tap ratio t is rounded to the nearest possible value, according to the incremental tap ratio.

The admittances of the equivalent circuit are calculated from their nominal values and from the tap ratio t as $$Y_{ULTC}=tY$$

$$Y_{1ULTC}=t(t-1)Y$$

$$Y_{2ULTC}=(1-t)Y$$

For the second case, when the nominal value V2nom of the regulated voltage is not known, the voltage phasors V1,V2 on both sides of the ULTC transformer, and the current phasor 12 on the side of the regulated voltage V2 must be known. The tap ratio t is calculated as $$t=\frac{YV2-I2}{YV1}.$$

For a given network topology, the placement of PMUs 1 and the exact sequence of operations for computing voltages and inferring the status of network element status is determined e.g. manually and with computer assistance in an engineering phase of the system according to the invention. Preferably, a set of PMUs 1 that is required for other purposes is given. Starting with their measurements, equations for determining as many voltages and current phasors at nodes and lines not equipped with PMUs are generated. This is done for all possible topologies, i.e. for all network elements being either connected or disconnected. If, for certain cases, the existing phasor measurements are not sufficient, an additional PMU 1 is introduced either at the location where information is required, or at a node connected to said location.

In a preferred embodiment of the invention, the placement of PMUs 1 is minimised in a two-step procedure: in a first step, the minimum number of substations equipped with PMUs 1 is determined, assuming that in such a substation, each node equipped with an instrument transformer has an associated PMU. In a second step, a minimum number of PMU's for each substation is determined.

Figure 5:
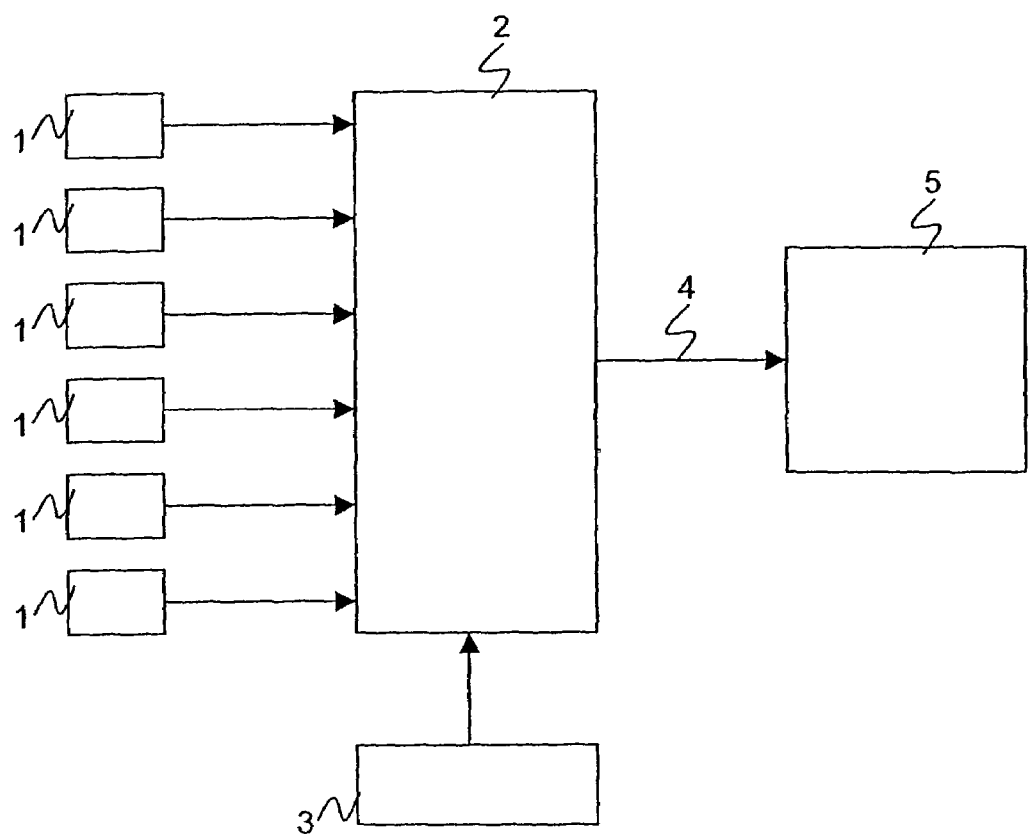
FIG. 5 schematically shows the structure of a system according to the invention.

FIG. 5 schematically shows the structure of a system according to the invention. Each of a plurality of PMUs 1 transmits current and/or voltage phasor information to a network element status detection 2. The network element status detection 2 is a data processing device configured to determine the status of network elements, as shown above. It is configured to receive, as an additional input, network element parameters 3 such as line and shunt admittances, tap ratio increments, limits and deadband values, regulated voltages etc. In a preferred embodiment of the invention the network element status detection 2 transmits the status of network elements together with the phasor information as status and phasor information 4 to a state calculation/estimation data processing device 5. This information 4 is used by the state calculation/estimation 5 to estimate a state of the network, e.g. by doing a load flow analysis, in which topology information is given by the status of network elements without the need of additional measurements.

LIST OF DESIGNATIONS

| | |
|---|---|
| 1 | phasor measurement unit (PMU) |
| 2 | network element status detection |
| 3 | network element parameters |
| 4 | status and phasor information |
| 5 | state calculation/estimation |
| 11 | first substation |
| 12 | second substation |
| 13 | compensation element |
| 13 | third substation |
| 31 | transformer |
| 32 | busbar connector |
| 33 | load |
| n1, n2 ... n7 | first node, second node, ... seventh node |
| L1, L2, ... L8 | first line, second line, ... eighth line |
| I ... | current phasor |
| V ... | voltage phasor |
| Y ... | complex admittance |
| t | tap ratio |

The invention claimed is:

1. A method for estimating a state of an electric power transmission network, comprising:
   measuring phasors at a first set of locations throughout the network via phasor measurement units located at the first set of locations, wherein the resulting phasor measurements include time-stamps;
   estimating a plurality of voltage and/or current phasors at a second set of locations throughout the network based on the phasor measurements from the first set of locations, wherein the locations of the first and second sets of locations are distant from one another; and
   inferring a status of network elements that are remotely located from the phasor measurement units, based on the phasor measurements and the estimated phasors.

2. The method according to claim 1, in which voltages and/or currents at a substation that is not equipped with phasor measurement units are estimated.

3. The method according to claim 1, in which a state of the network comprising load and current flows of the network is estimated from the measured and estimated voltages and currents and from an estimated topology of the network.

4. The method according to claim 1, in which the network elements comprise switchgear and the status of network elements comprises information on whether a switch is open or closed.

5. The method according to claim 1, in which the network elements comprise transmission lines and the status of network elements comprises information on whether a transmission line is disconnected or in service.

6. The method according to claim 1, in which the network elements comprise under load tap changing transformers and the status of network elements comprises information on a tap ratio of the transformer.

7. The method according to claim 1, in which the network elements comprise at least one compensation device or FACTS device and the status of network elements comprises information on whether said device is electrically connected to or disconnected from the network.

8. A system for estimating a state of an electric power transmission network from time-stamped phasor measurements that originate from phasor measurement units located at a first set of locations throughout the network, wherein
   the system comprises a data processing device configured to
   compute a plurality of estimated voltage and/or current phasors at a second set of locations based on the time-stamped phasor measurements, the locations of the first and second sets of locations being distant from one another, and to
   compute, from the phasor measurements and from the estimated phasors, a status of network elements that are remotely located from the phasor measurement units.

9. The system according to claim 8, wherein the data processing device is configured to estimate voltages and/or currents at a substation that is not equipped with phasor measurement units.

10. A method for estimating a state of an electric power transmission network, comprising:
    measuring phasors at a first set of locations throughout the network via phasor measurement units located at the first set of locations;
    estimating a plurality of voltage and/or current phasors at a second set of locations throughout the network, wherein the second set of locations is not equipped with phasor measurement units for measuring phasors, and wherein locations of the first and second sets of locations are distant from one another; and
    inferring a status of network elements that are remotely located from the phasor measurement units, based on the phasor measurements and the estimated phasors.

* * * * *